No. 863,477. PATENTED AUG. 13, 1907.
G. H. WHITE.
APPARATUS FOR WELDING RINGS, &c.
APPLICATION FILED JAN. 30, 1906.
2 SHEETS—SHEET 1.
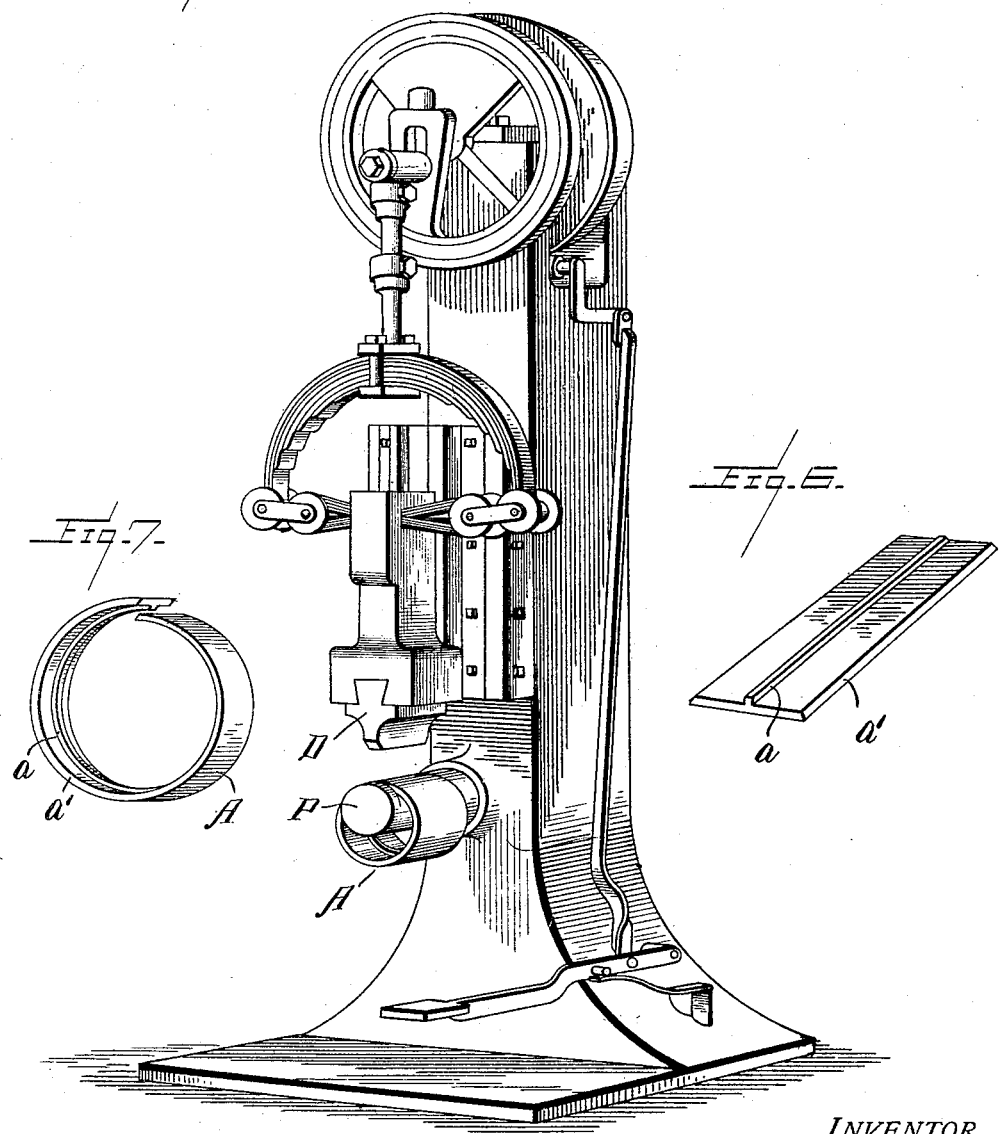

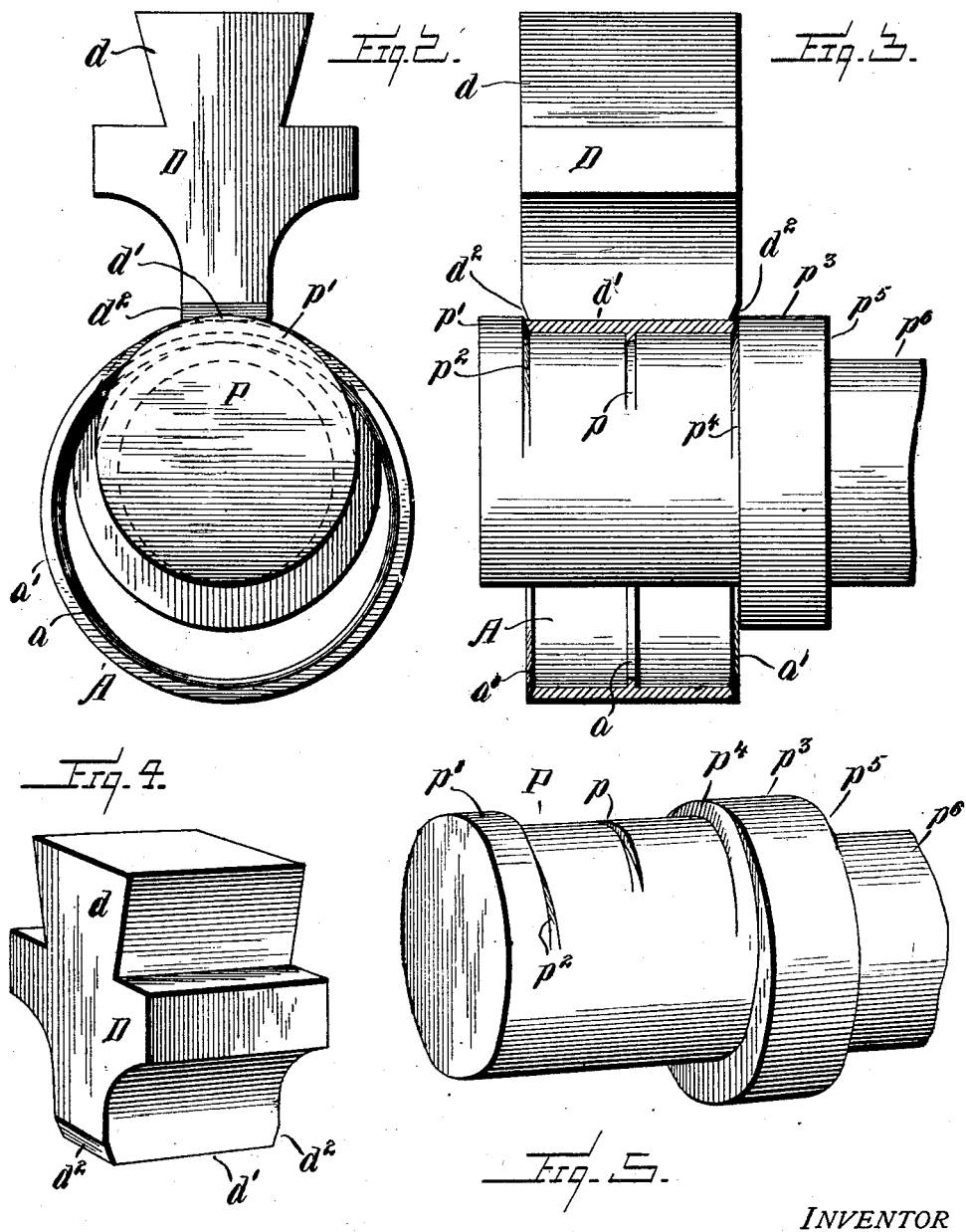

UNITED STATES PATENT OFFICE.

GEORGE HENRY WHITE, OF OIL CITY, PENNSYLVANIA, ASSIGNOR TO S. R. DRESSER MANUFACTURING COMPANY, OF BRADFORD, PENNSYLVANIA.

APPARATUS FOR WELDING RINGS, &c.

No. 863,477.

Specification of Letters Patent.

Patented Aug. 13, 1907.

Application filed January 30, 1906. Serial No. 298,729.

*To all whom it may concern:*

Be it known that I, GEORGE HENRY WHITE, a citizen of the United States, residing at Oil City, in the county of Venango and State of Pennsylvania, have invented certain new and useful Improvements in Apparatus for Welding Rings and Like Articles; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one form in which I have contemplated embodying my invention and the invention is fully disclosed in the following description and claims.

Referring to the said drawings, Figure 1 represents a perspective view of a power hammer of known construction showing my improved devices applied thereto. Fig. 2 is a front view, drawn to an enlarged scale of the hammer peg and the hammer die, and showing a ring held in operative position, for welding. Fig. 3 represents a side elevation of the parts shown in Fig. 2, the ring being shown in section. Fig. 4 is a detail perspective view of the hammer die, detached. Fig. 5 is a detail view of one end of the hammer peg. Fig. 6 is a detail view showing a blank from which the ring herein shown is formed, and Fig. 7 shows the blank bent into ring form preparatory to welding its ends together.

The object of my invention is to provide dies of improved construction for welding, said dies being ordinarily applied to a power hammer, and being adapted for the welding of metal rings or other tubular devices and more especially for the welding of a metal ring of the kind described in my application for improvements in process of making metal rings filed by me Jan. 13, 1906 and given Serial No. 295,889. These dies comprise an anvil, which is adapted to be secured to the frame of a power hammer in position to support and retain the ring during the welding operation, and a hammer die, which is adapted to be carried by the movable part of the power hammer. The anvil when applied to a power hammer is ordinarily termed in the art the "hammer peg".

In the manufacture of metal rings of the kind described, which are adapted for use as pipe couplings, or form parts of such couplings, a flat metal strip or "skelp" of iron or steel of a width substantially equal to the length of the desired ring, is cut into lengths to form blanks which are then bent into ring shape by suitable means, and their ends are welded together. In forming the ring herein shown and for which the welding dies are especially adapted, a skelp is used which is provided with a central longitudinal bead on one face and which has its lateral edges beveled or inclined inwardly toward the beaded face. A blank cut from such a skelp is shown at A, Fig. 6, provided with the bead $a$ and beveled edges $a'$ $a'$. In forming this blank into a ring the blank is bent with the bead inside, and the ends which are cut parallel and inclined to the faces of the blank are lapped slightly to facilitate the welding operation, as shown in Fig. 7.

While the dies herein shown and described could be used in other ways, I prefer to employ them in connection with a power hammer substantially as herein shown and described. H represents a power hammer of a well known type, although the dies may be employed with other forms of hammer, the particular construction of which forms no part of my invention. P represents the anvil or "hammer peg", which has a main body of substantially cylindrical form provided on its upper face with a central transversely disposed groove $p$, which is of a width and depth sufficient to receive the bead $a$ of the ring A. This groove need not extend entirely around the body of the "peg" and preferably is reduced in depth at either side thereof until it vanishes as clearly shown in the drawings. The front end of the "peg" is provided with an outwardly extending flange $p'$ having its inner edge or shoulder beveled as at $p^2$, to conform to the beveled edge of the ring (see Fig. 3) and this flange $p'$ and beveled portion $p^2$ are preferably gradually reduced in height at the sides of the "peg" until they disappear, as shown.

The inner end of the cylindrical body of the "peg" is provided with a similar projecting flange $p^3$ having an inner beveled face $p^4$ to conform to the edge of the ring, and the beveled face $p^4$ is preferably reduced at each side until it vanishes, while the flange proper is preferably retained for the purpose of forming on its outer or rear face an annular shoulder $p^5$ where it joins a cylindrical stem $p^6$ forming an integral part of the "peg". In order to support the "peg" in position, it is customary to provide a horizontal aperture in the frame of the hammer body, as indicated in Fig. 1 into which the stem $p^6$ of the "peg" is driven, and secured in any desired manner against longitudinal and rotary movement, while in use. The stem of the peg will be of such length and size that its engagement with the hammer frame will form a strong support for the outer end of the "peg" which forms the anvil upon which the welding operation is performed.

It will be seen by reference to Fig. 3 that when a ring such as the ring A, is placed upon the "peg" the central bead will fit into the central groove $p$, and the edges of the ring will fit between the flanges $p'$ and $p^3$, the beveled inner faces $p^2$ and $p^4$ fitting the beveled edges of the ring and the ring will thus be held firmly in position while it is welded, and at the same time the metal of the welded portion will be made to conform accurately to the adjacent portions of the ring thus preserving the continuity of the internal bead $a$, and the inclined edges $a'$ $a'$ of the ring. In connection with this hammer "peg" or die, I prefer to employ the form of hammer die shown at D in the drawings, though I do not limit myself to the use of any particular form of hammer with the "peg" herein shown and described. The hammer die D consists of a block having a dovetailed upper portion $d$, adapted to fit into a dovetailed recess in the reciprocating hammer head, as shown in Fig. 1 and to be rigidly secured therein in any desired manner. The hammer die has a reduced striking face at its lower end shown at $d'$ which is disposed longitudinally of the hammer peg, and has its front and rear edges preferably beveled as at $d^2$ $d^2$ to correspond with the beveled portions $p^2$, $p^4$ of the "peg". The bottom face of the hammer die is ordinarily made flat as shown though it may be slightly rounded.

In welding the ends of a ring such as one of the rings A, the meeting ends of the blank are brought to the required temperature and the ring placed upon the hammer "peg" as shown in Figs. 1, 2 and 3 and the hammer is then operated so as to cause a series of blows to be struck by the hammer die D. As before stated the lateral retaining flanges of the "peg" P retain the ring firmly against lateral movement under the hammer and the central groove and the inner walls of the said flanges retain the metal at the weld so that the continuity of the central bead, and of the edges of the ring is preserved, as the metal will not be able to expand laterally beyond the flanges $p'$, $p^3$, but will be retained between them and thus the edge portions of the weld will be brought into uniformity with other portions of the edges of the ring.

What I claim and desire to secure by Letters Patent is:—

1. In an apparatus for joining the ends of rings provided with an internal annular bead, a supporting anvil having its upper face curved to correspond with the curvature of the ring, and adapted to support a portion thereof and provided with a transverse groove to receive the meeting portions of the said bead, and transverse shoulders on opposite sides of the said groove, for preserving the continuity of and preventing the spreading of the edges of the ring, substantially as described.

2. In an apparatus for joining the ends of rings provided with an internal annular bead, and beveled edge portions, a supporting anvil having its upper face curved to correspond with the curvature of the ring and adapted to support a portion thereof, and provided with a transverse groove to receive the meeting portions of the annular bead and transverse shoulders on opposite sides of the said groove inclining away from each other from bottom upward, for preserving the continuity of the edges of the ring and preventing the spreading thereof, substantially as described.

In testimony whereof I affix my signature, in the presence of two witnesses.

GEORGE HENRY WHITE.

Witnesses:
ELIZABETH MULLIGAN,
JOS. W. BARR.